(12) United States Patent
Nakai et al.

(10) Patent No.: US 12,743,247 B2
(45) Date of Patent: Sep. 22, 2026

(54) ACOUSTIC DEVICE, PROGRAM, AND CONTROL METHOD

(71) Applicant: AlphaTheta Corporation, Yokohama (JP)

(72) Inventors: Toshiki Nakai, Yokohama (JP); Nao Takagi, Yokohama (JP); Shintaro Kido, Yokohama (JP)

(73) Assignee: AlphaTheta Corporation, Yokohama (JP)

( * ) Notice: Subject to any disclaimer, the term of this patent is extended or adjusted under 35 U.S.C. 154(b) by 220 days.

(21) Appl. No.: 18/711,779

(22) PCT Filed: Nov. 22, 2021

(86) PCT No.: PCT/JP2021/042839
§ 371 (c)(1),
(2) Date: May 20, 2024

(87) PCT Pub. No.: WO2023/089836
PCT Pub. Date: May 25, 2023

(65) Prior Publication Data

US 2025/0021296 A1 Jan. 16, 2025

(51) Int. Cl.
*G06F 3/16* (2006.01)
*G06F 3/14* (2006.01)
(Continued)

(52) U.S. Cl.
CPC ................ *G06F 3/165* (2013.01); *G06F 3/14* (2013.01); *G10H 1/0008* (2013.01); *G10K 15/02* (2013.01);
(Continued)

(58) Field of Classification Search
CPC ........... G06F 3/165; G06F 3/14; G10K 15/02; G10H 1/0008; G10H 1/46;
(Continued)

(56) References Cited

U.S. PATENT DOCUMENTS

2022/0394354 A1* 12/2022 Takahashi .......... H04N 21/6587
2023/0335091 A1* 10/2023 Morsy .................. G10H 1/0025

FOREIGN PATENT DOCUMENTS

JP 2009-217079 A 9/2009
JP 2021-145838 A 9/2021
WO 2019/130595 A1 7/2019

OTHER PUBLICATIONS

International Search Report dated Jan. 18, 2022, Application No. PCT/JP2021/042839; 4 pages.

(Continued)

*Primary Examiner* — Yogeshkumar Patel
(74) *Attorney, Agent, or Firm* — Rankin, Hill & Clark LLP

(57) ABSTRACT

An acoustic device configured to mix a first music piece and a second music piece includes: a reservation unit configured to set a playback start point of the second music piece; and a display controller configured to display a first screen on a display device, where, on the first screen, a first image indicating a playback status of the second music piece and time information of the playback start point is moved based on a second image indicating a current playback point when a reservation set by the reservation unit is executed.

8 Claims, 8 Drawing Sheets

Figure 1:
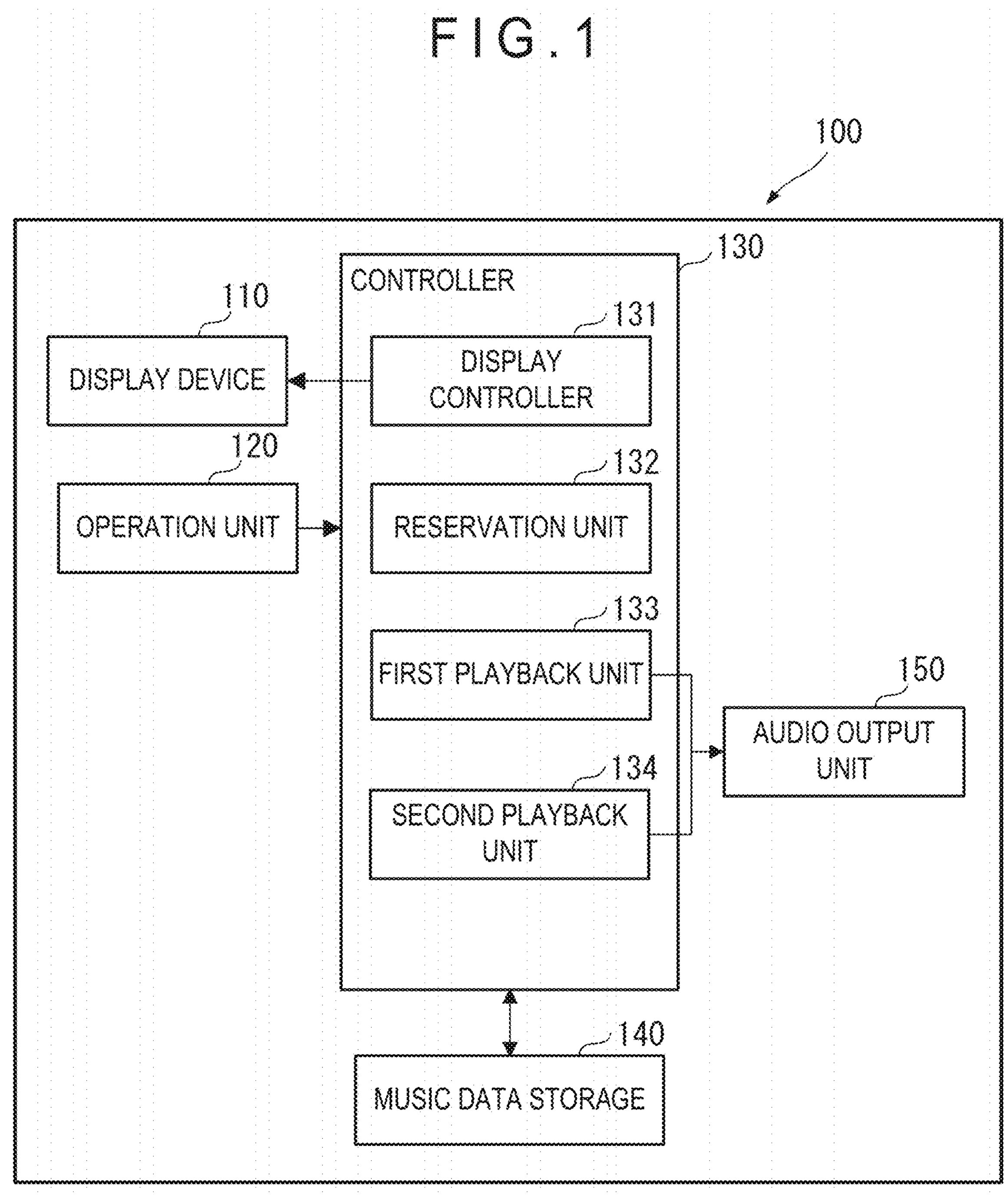

(51) Int. Cl.
*G10H 1/00* (2006.01)
*G10K 15/02* (2006.01)

(52) U.S. Cl.
CPC . *G10H 2210/125* (2013.01); *G10H 2220/106* (2013.01); *G10H 2220/116* (2013.01)

(58) Field of Classification Search
CPC ....... G10H 2210/125; G10H 2220/106; G10H 2220/116; G10H 2240/325; H04R 3/00
See application file for complete search history.

(56) References Cited

OTHER PUBLICATIONS

Native Instruments, "Traktor Pro 3.0", https://www.native-instruments.com/fileadmin/ni_media/downloads/manuals/traktor/TRAKTOR_PRO_3.0_Manual_Japanese_0719.pdf; English translation included; discussed in the specification, 400 pages.
International Preliminary Report on Patentability dated May 2, 2024, Application No. PCT/JP2021/042839; 4 pages.

* cited by examiner

FIG. 3A

110
E23
E21
A1
DECK 1
DECK 2
201
E22

FIG. 3B

110
E26
E24
DECK 1
A2
202
E25
DECK 2

START
S101
DISPLAY USUAL PLAYBACK SCREEN ON DISPLAY DEVICE
S102
OPERATION FOR SETTING RESERVATION HAS BEEN PERFORMED?
NO
YES
S103
DISPLAY RESERVATION-SETTING SCREEN ON DISPLAY DEVICE
S104
RESERVATION HAS BEEN SET?
NO
YES
S105
RESERVATION EXECUTION STARTED?
NO
YES
S106
DISPLAY RESERVATION-EXECUTION SCREEN ON DISPLAY DEVICE
S107
RESERVATION EXECUTION COMPLETED?
NO
YES

ACOUSTIC DEVICE, PROGRAM, AND CONTROL METHOD

TECHNICAL FIELD

The present invention relates to an acoustic device, a program, and a control method.

BACKGROUND ART

Various technologies have been devised in the field of acoustic devices and application software related to Digital Audio Workstation (DAW) and Desk Top Music (DTM). For instance, Non-Patent Literature 1 discloses application software capable of setting a reservation related to audio mixing.

CITATION LIST

Non-Patent Literature(s)

Non-Patent Literature 1: Manual of Traktor Pro 3.0 (produced by Native Instruments) (https://www.native-instruments.com/fileadmin/ni_media/downloads/manuals/traktor/TRAKTOR_PRO_3.0_Manual_Japanese_0719.pdf)

SUMMARY OF THE INVENTION

Problem(s) to be Solved by the Invention

However, it is impossible for a user to easily recognize how a reservation is set and executed when the above-described reservation is to be set and executed, which impairs usability for the user.

An object of the invention is to provide an acoustic device, a program, and a control method that enables a user to conveniently perform mixing of music pieces even while a music piece is being played.

Means for Solving the Problem(s)

[1] An acoustic device configured to mix a first music piece and a second music piece, the acoustic device including: a reservation unit configured to set a playback start point of the second music piece; and a display controller configured to display a first screen on which a first image indicating a playback status of the second music piece and time information of the playback start point is moved based on a second image indicating a current playback point on a display device when a reservation set by the reservation unit is executed.

[2] The acoustic device according to [1], in which the first image includes an image indicating a music waveform of the second music piece and the playback start point provided on the music waveform.

[3] The acoustic device according to [1] or [2], in which the reservation unit is configured to set the playback start point of the second music piece while the first music piece is being played.

[4] The acoustic device according to any one of [1] to [3], in which the display controller is configured to switchably display, on the display device, the first screen and a second screen on which the reservation unit sets the playback start point of the second music piece.

[5] The acoustic device according to [4], in which the display controller is configured to: on the first screen, display the first image in motion on the display device since before the current playback point of the second music piece reaches the playback start point; and on the second screen, display an image indicating a playback status of the first music piece in motion and the image indicating the playback status of the second music piece in motion on the display device in response to a user's operation.

[6] The acoustic device according to any one of [1] to [5], in which the reservation unit is configured to set a mixing point on each of the first music piece and the second music piece and set the playback start point corresponding to the mixing point.

[7] The acoustic device according to any one of [1] to [6], in which the display controller is configured to, on the display device, fixedly display the second image and display the first image in a manner moving based on the second image in accordance with the current playback point on the first screen.

[8] The acoustic device according to any one of [1] to [7], in which the display controller is configured to display the first image with a display mode of a part of the first image indicating the playback status of the second music piece being changed on the first screen on the display device when the reservation set by the reservation unit is executed and the current playback point reaches the playback start point.

[9] A program configured to cause a computer to function as the acoustic device according to any one of [1] to [8].

A control method executed using an acoustic device configured to mix a first music piece and a second music piece, the control method including: setting a playback start point of the second music piece; and displaying a first screen on which a first image indicating a playback status of the second music piece and time information of the playback start point is moved based on a second image indicating a current playback point on a display device when a set reservation is executed.

BRIEF EXPLANATION OF DRAWING(S)

FIG. 1 is a block diagram schematically illustrating a functional arrangement of an acoustic device according to an exemplary embodiment of the invention.

Figure 2:
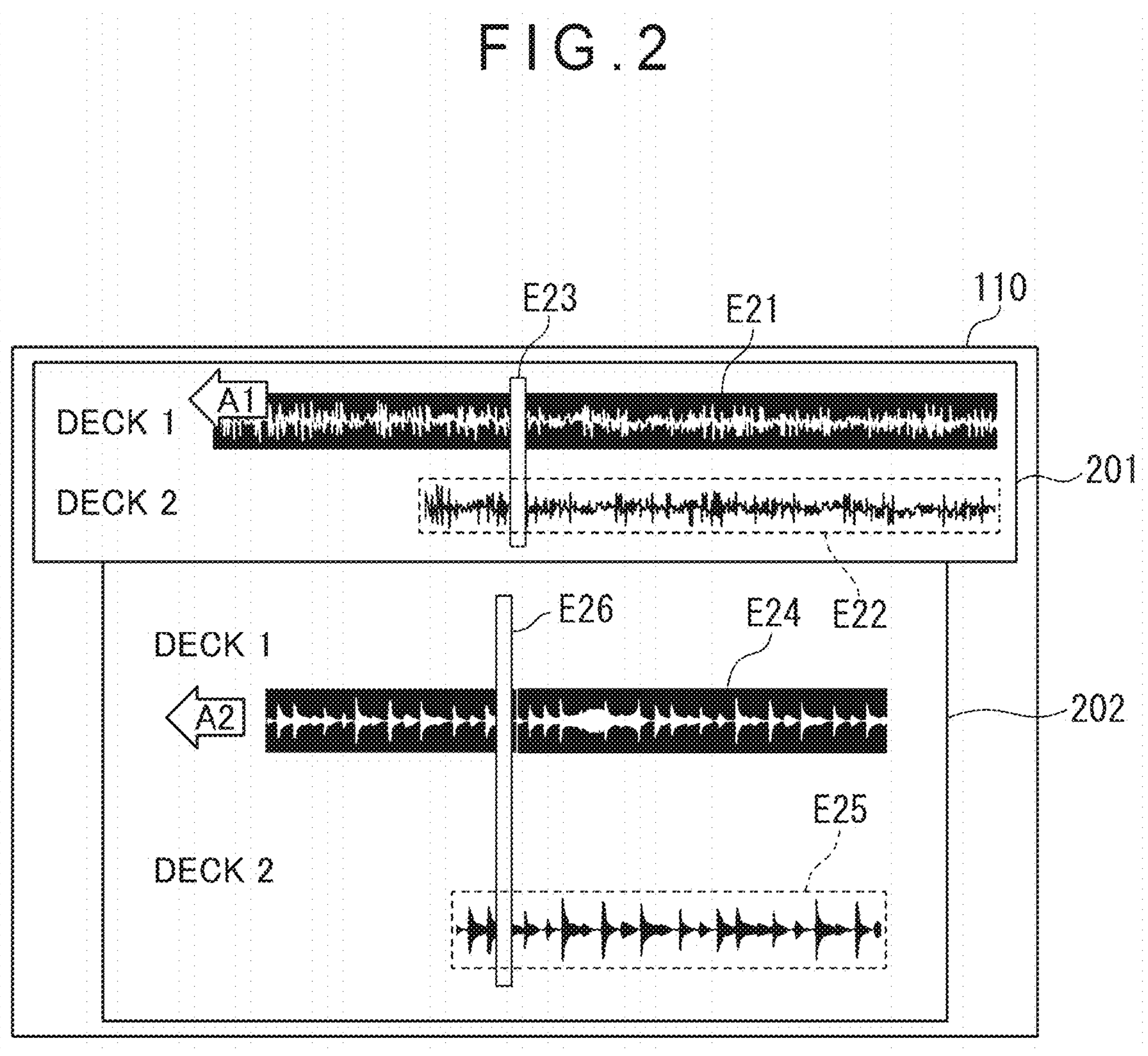

FIG. 2 schematically illustrates an example of a display screen according to an exemplary embodiment of the invention.

Figures 3A, 3B:
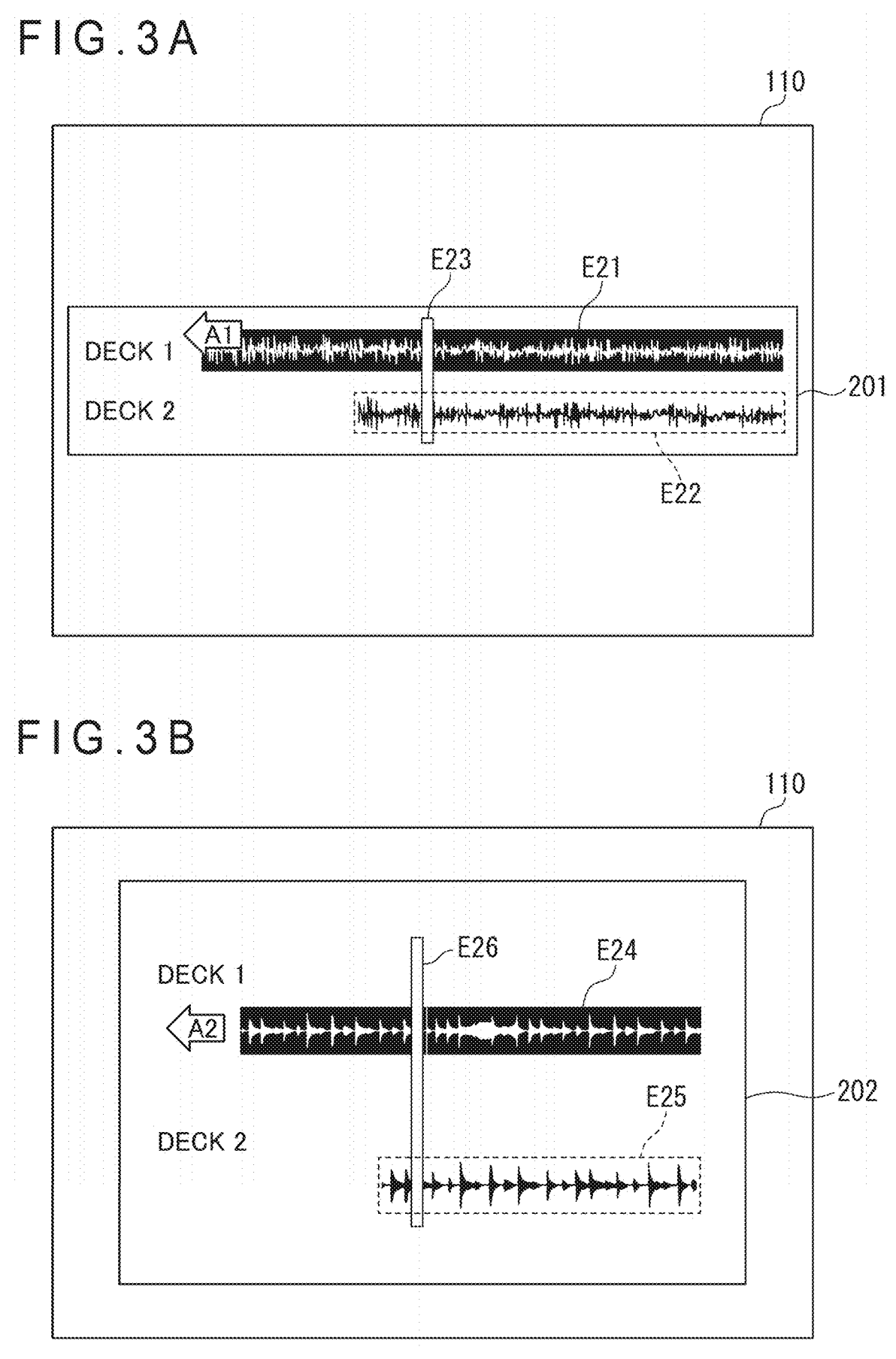

FIG. 3A schematically illustrates another example of the display screen according to the exemplary embodiment of the invention.

FIG. 3B schematically illustrates still another example of the display screen according to the exemplary embodiment of the invention.

Figure 4:
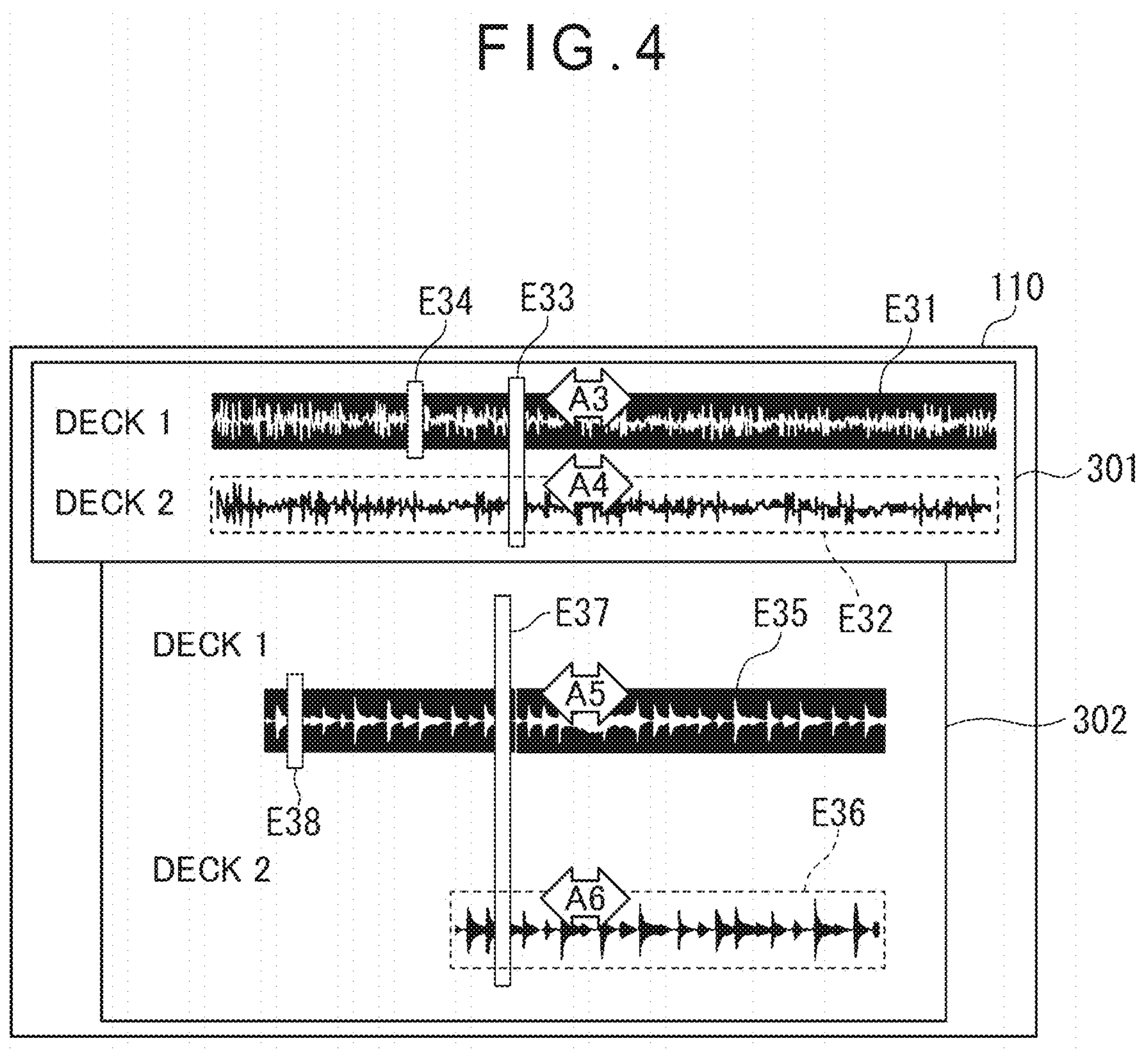

FIG. 4 schematically illustrates a further example of the display screen according to the exemplary embodiment of the invention.

Figure 5:
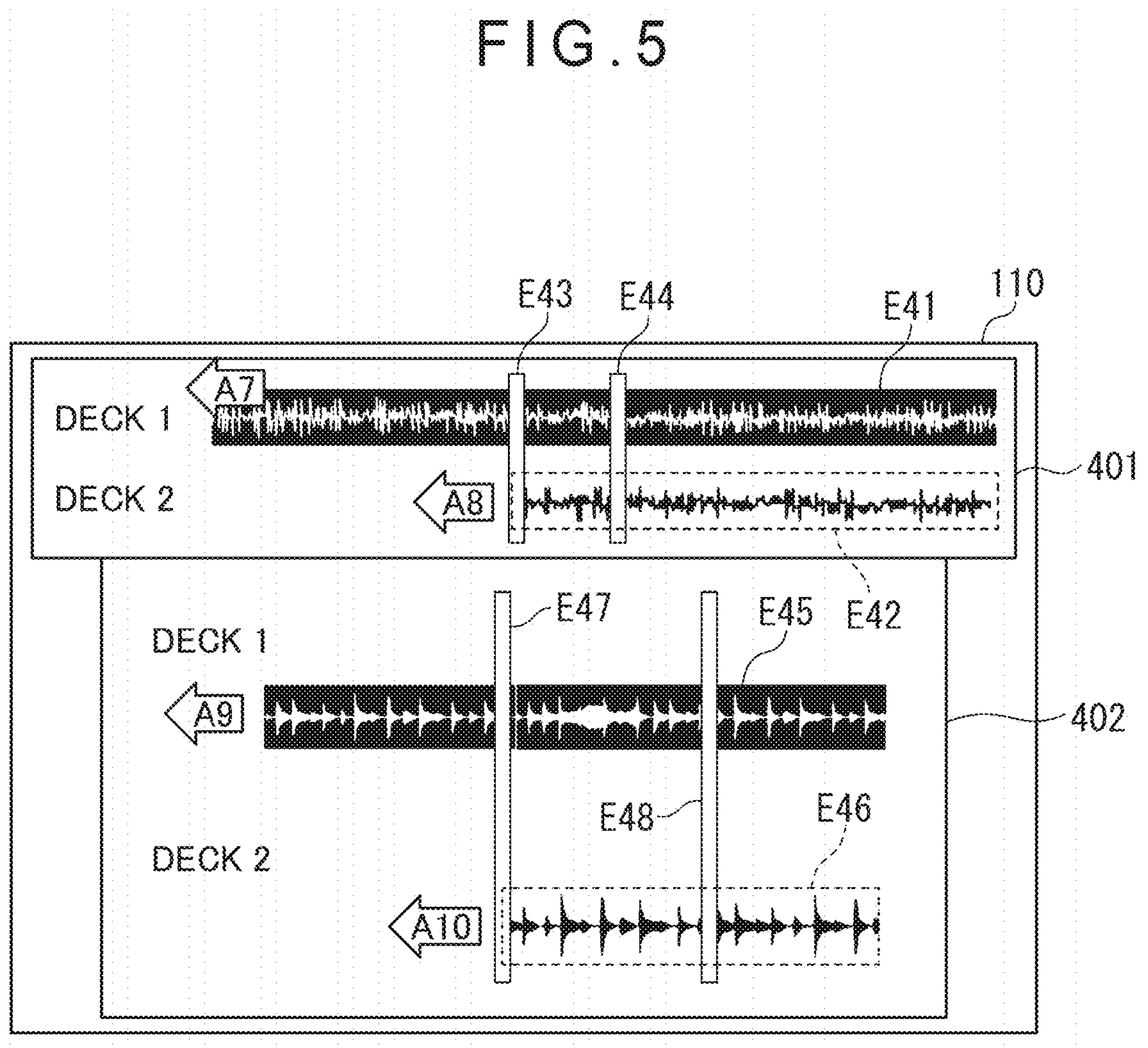

FIG. 5 schematically illustrates a further example of the display screen according to the exemplary embodiment of the invention.

Figure 6:
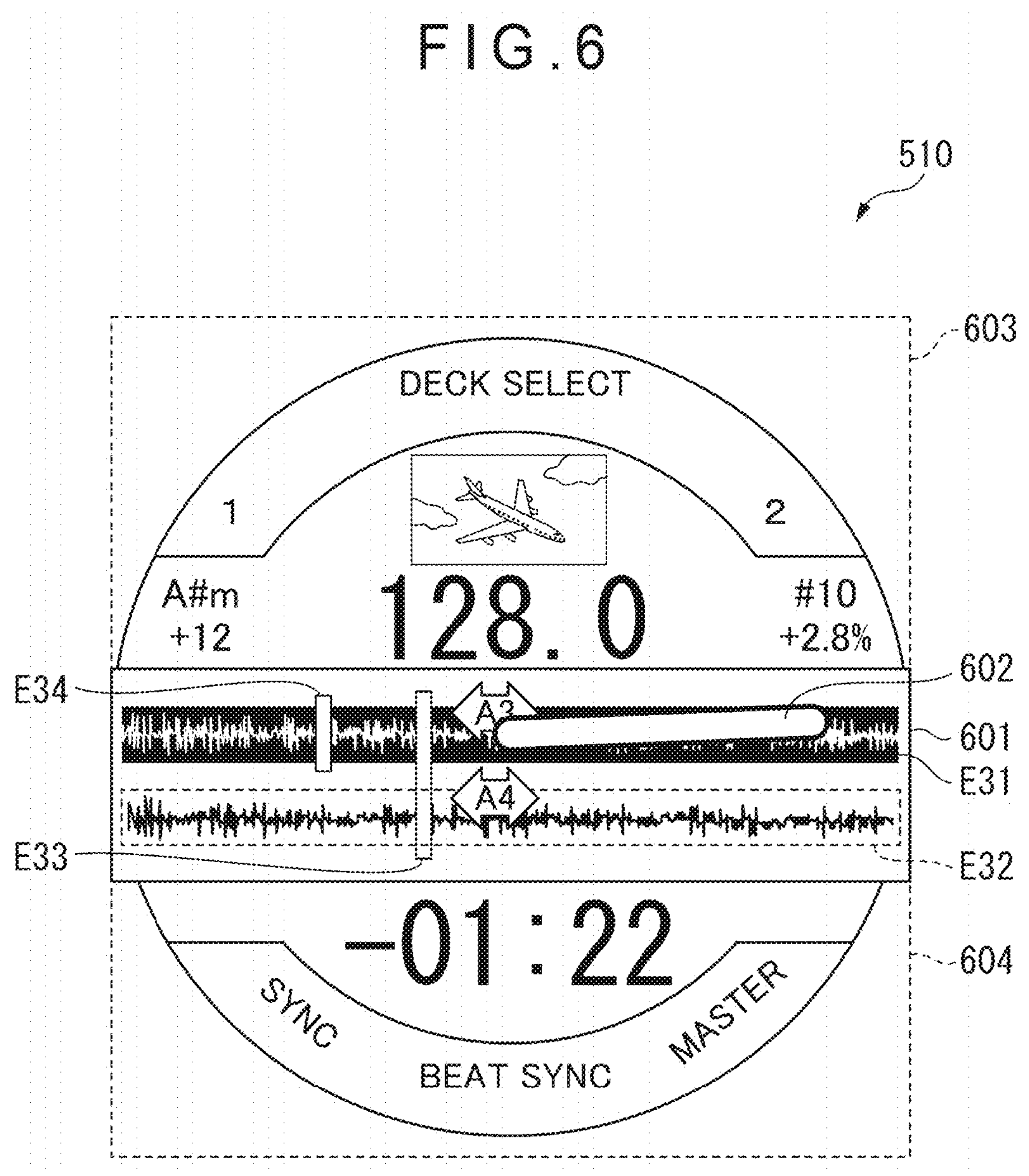

FIG. 6 schematically illustrates a further example of the display screen according to the exemplary embodiment of the invention.

Figure 7A:
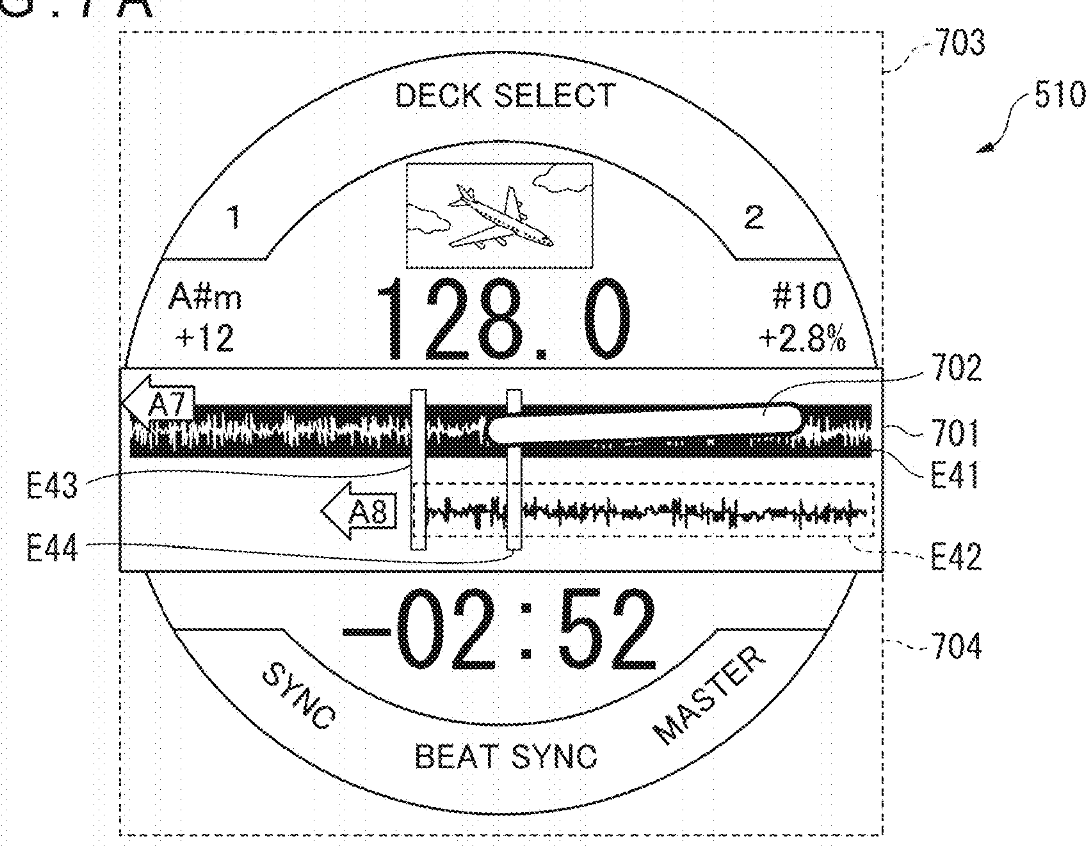

FIG. 7A schematically illustrates another example of the display screen according to the exemplary embodiment of the invention.

Figure 7B:
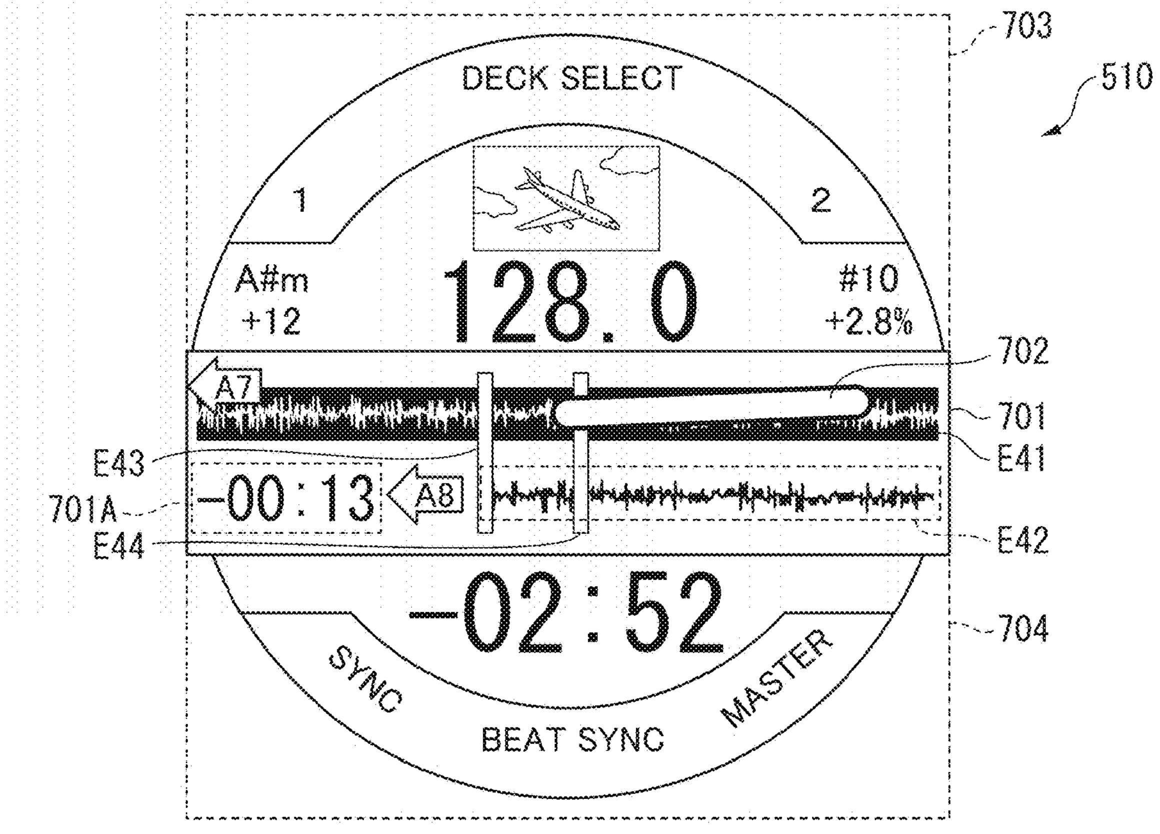

FIG. 7B schematically illustrates still another example of the display screen according to the exemplary embodiment of the invention.

Figure 8:
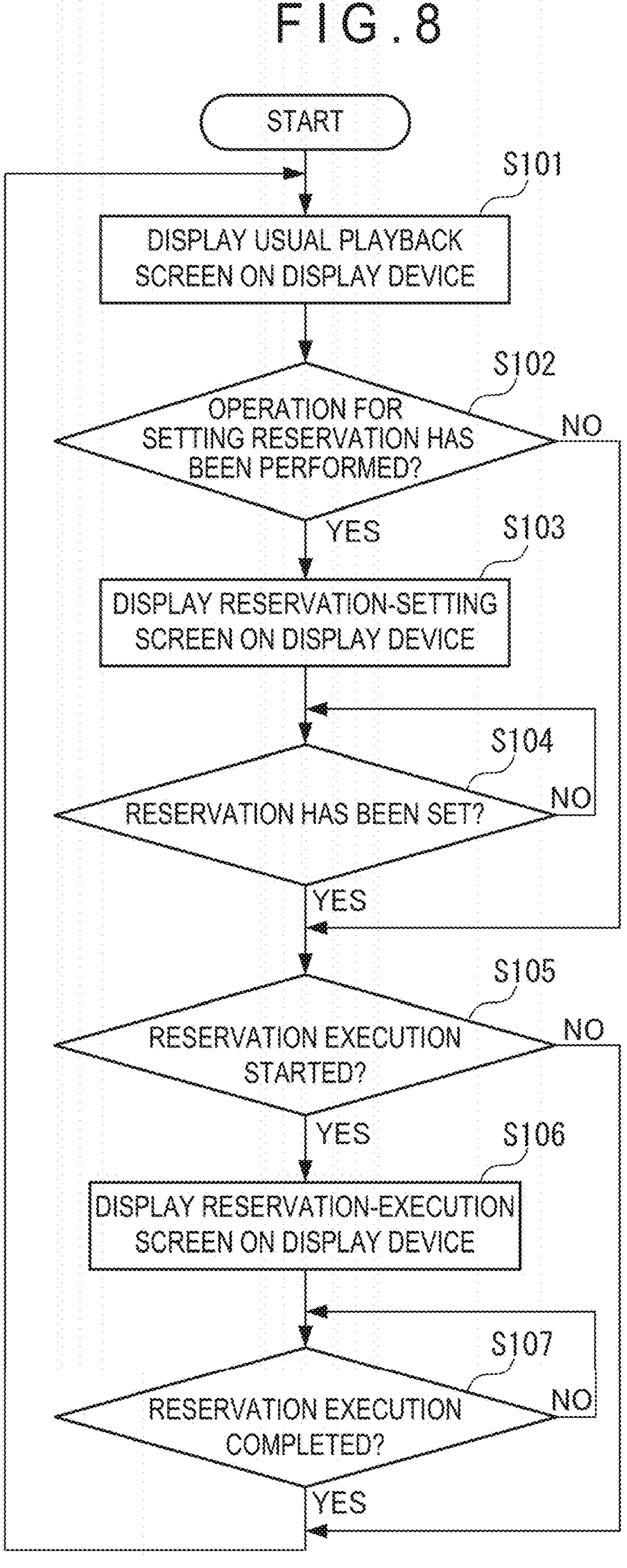

FIG. 8 is a flowchart illustrating a control method according to an exemplary embodiment of the invention.

DESCRIPTION OF EMBODIMENT(S)

The following describes preferred exemplary embodiments of the invention in detail with reference to the accompanying drawings. It should be noted that components of the same or substantially the same function(s) and structure(s) will be denoted by the same reference numerals in the specification and drawings, omitting repetition of description thereof.

FIG. 1 is a block diagram schematically illustrating a functional arrangement of an acoustic device according to an exemplary embodiment of the invention. The acoustic device according to the exemplary embodiment of the invention may be a player, a mixer that controls a player, an integrated DJ system of a player and a mixer, or an acoustic device using a portable terminal such as a smartphone and a tablet terminal. The invention is also similarly applicable to a DJ controller without playback function.

An acoustic device 100 has functions as a first player for playing a first music piece (referred to as a DECK 1 hereinafter), a second player for playing a second music piece (referred to as a DECK 2 hereinafter), and a mixer for controlling both of the DECKs 1 and 2.

As illustrated in FIG. 1, the acoustic device 100 includes a display device 110, an operation unit 120, a controller 130, a music data storage 140, and an audio output unit 150. The functions of the above units are implemented by, for instance, arranging the acoustic device configured as a computer hardware and operating a processor of the acoustic device in accordance with a computer program stored on a non-transitory computer-readable storage medium. The functions of the above units will be further described below.

The display device 110 displays a screen indicating various information in the acoustic device 100. The display device 110 is exemplified by various devices such as liquid crystal display devices and organic electroluminescent display devices. The display device 110 is optionally configured as a touch panel, which includes operators displayed on a screen and a contact sensor and the like that detects a contact point, to receive a user's operation.

The operation unit 120 receives various user's operations through the operators and outputs information indicating the details of the user's operation to the controller 130. The information indicating the details of the user's operation is delivered to components in the controller 130. Illustration and detailed description of the operation unit 120 will be omitted herein since the operation unit 120 can be provided using various known techniques.

The control unit 130, which is implemented in the acoustic device 100 in a form of, for instance, a communication interface, a processor (e.g. CPU (Central Processing Unit)), and a memory providing a working area, controls the operation of the acoustic device 100. The controller 130 includes a display controller 131, a reservation unit 132, a first playback unit 133, and a second playback unit 134, which are implemented by the processor that works in accordance with a program stored in the memory, stored on a non-transitory computer-readable storage medium, or received through the communication interface.

The display controller 131 displays, on the display device 110, a screen showing various information related to the music pieces to be played by the acoustic device 100.

The reservation unit 132 is configured to set a reservation for audio mixing of music pieces to be played by the first playback unit 133 and the second playback unit 134 based on a user's operation detected by the operation unit 120. Details of setting the reservation will be described later.

The first playback unit 133 is configured to decode the music piece played by the DECK 1 (first player) to produce audio signals and output the generated audio signals to the later-described audio output unit 150. The second playback unit 134 is configured to decode the music piece played by the DECK 2 (second player) to produce audio signals and output the generated audio signals to the later-described audio output unit 150.

The music data storage 140, which is provided by an HDD (Hard Disk Drive), flash memory, or the like, is capable of storing music data. The music data storage 140 stores music data of a plurality of music pieces in a predetermined format (e.g. MP3 format). The music data includes, in addition to audio information, information on BPM, art work, title, artist name, album title, key, the number of DJ performance, genre, and the like of the music pieces in a form of tag information. The music data stored in the music data storage 140 is associated with a time stamp representing information on playback position.

It should be noted that the acoustic device 100 optionally includes a communication interface (not illustrated), through which music data stored in an external storage, a computer, a non-transitory computer-readable storage medium, or the like is imported and stored in the music data storage 140. In this case, the acoustic device 100 does not include the music data storage 140 but the external storage serves as the music data storage 140.

The audio output unit 150 includes an audio output terminal such as speaker terminal or headphone terminal and outputs audio signals, as audio information, of the music pieces have been outputted by the first playback unit 133 and the second playback unit 134.

It should be noted that a series of processes from a process of generating the audio signals by the decoding by the first and second playback units 133 and 134 to a process of outputting the audio signals by the audio output unit 150 as the audio information will be referred to and described as "playback" in the present exemplary embodiment. A case where the audio signals are generated by the decoding by the first and second playback units 133 and 134 and the audio information is outputted by the audio output unit 150 will be referred to as a "playback with audio output." A case where the audio signals are generated by the decoding by the first and second playback units 133 and 134 but the audio information is not outputted by the audio output unit 150 (i.e. the audio output is muted) will be referred to as a "playback without audio output."

Various display screens related to audio mixing, which is to be displayed on the display device 110 of the above-described acoustic device 100, will be described below.

FIGS. 2, 3A, and 3B each illustrate an example of a usual playback screen. FIG. 4 illustrates an example of a reservation-setting screen for audio mixing. FIG. 5 illustrates an example of a reservation-execution screen for audio mixing. When a user's operation for usual playback is made using the operation unit 120, the display controller 131 displays a playback screen (a display screen for usual playback) as illustrated in FIG. 2 on the display device 110. When a user's operation of setting a reservation for audio mixing is made using the operation unit 120 while the music piece is being played, the display controller 131 displays on the display device 110 the reservation-setting screen shown in FIG. 4 as a display screen for setting a reservation. When the process of executing a reservation is started, the display controller 131 displays on the display device 110 the reservation-execution screen illustrated in FIG. 5 as a display screen for executing a reservation.

In other words, the display controller 131 switchably displays the playback screen, the reservation-setting screen (second screen), and the reservation-execution screen (first screen) on the display device 110. Accordingly, a user can check a usual playback status based on the playback screen illustrated in FIG. 2, set a reservation for audio mixing based on the reservation-setting screen illustrated in FIG. 4, and check the playback status in executing the reservation based on the reservation-execution screen illustrated in FIG. 5.

Usual Playback Screen

The playback screen illustrated in FIG. 2 includes a display area 201 indicating information on an entirety or a part of the music piece and a display area 202 indicating a part of the display area 201 in an enlarged manner. A case where a music piece is played (playback with audio output) by the DECK 1 and no music piece is played by the DECK 2 will be described below.

In the display area 201, an image in a form of a waveform E21 indicating time information of an entirety or a part of the music piece being played by the DECK 1, an image in a form of a waveform E22 indicating time information of an entirety or a part of the music piece to be played by the DECK 2, and an image in a form of a bar E23 indicating the current playback point of the music piece are illustrated. It should be noted that the image of each of the waveforms may be generated in advance for each of the music pieces or may be generated in real time based on information after the decoding process by the first and second playback units 133 and 134. The same applies to waveforms in the description hereinbelow.

Images displayed in the display area 202 include: a waveform E24 of the music piece being played by the DECK 1, which is an enlarged image of a part near the current playback point of the waveform E21 displayed in the display area 201; a waveform E25 of the music piece to be played by the DECK 2, which is an enlarged image of a part the waveform E22 displayed in the display area 201; and an image in a form of a bar E26 indicating the current playback point.

It should be noted that information indicating so-called CUE POINTs (e.g. preset playback start points and playback standby points of the music pieces of the DECKs) may also be illustrated in the display area 201 and the display area 202.

In the display area 201 in the usual playback screen, the display controller 131 displays the bar E23, which is an image indicating the current playback point of the music piece being currently played by the DECK 1, at a fixed predetermined position while displaying the waveform E21 in a manner moving in a left direction on the screen (i.e., direction indicated by an arrow A1) based on the fixed bar E23 in accordance with the current playback point. Consequently, a user can locate the current playback point of the music piece in view of the waveform E21 of the currently played music piece that is moving in accordance with the playback status.

In contrast, the waveform E22 of the music piece to be played by the DECK 2 is fixedly displayed in the same manner as the fixedly displayed bar E23. At this time, a playback point corresponding to the CUE POINT is optionally displayed in a manner aligned with the bar E23.

Similarly, in the display area 202, the display controller 131 displays the waveform E24 of the currently played music piece in a manner moving in a left direction on the screen (i.e., direction indicated by an arrow A2) based on the fixedly displayed bar E26 in accordance with the current playback point. Consequently, a user can locate the current playback point of the currently played music piece in view of the waveform E24 of the currently played music piece, which is moving in accordance with the playback status.

It should be noted that, though enlarged images of parts of the display area 201 are displayed in parallel in the display area 202 in the example illustrated in FIG. 2, two or more images of waveforms with different magnifications are optionally displayed in a switching manner. For instance, a screen as illustrated in FIG. 3A corresponding only to the display area 201 in FIG. 2 and a screen as illustrated in FIG. 3B corresponding only to the display area 202 in FIG. 2 are optionally displayed in a switching manner. Alternatively, only one of the above screens is optionally displayed. Further, a zooming ratio of the screens is suitably determined and the screens are suitably switched in response to a user's operation through the operation unit 120.

As described above, since the waveform of the currently played music piece is displayed in motion on the playback screen, a user, who sees that the waveform is running, can intuitively recognize that the music piece is being played (i.e. playback with audio output). Further, the display area 202, in which information before and after the playback point can be checked in detail, is useful in supporting a user's DJ performance and the like.

Reservation-Setting Screen for Audio Mixing

The user's operation of setting a reservation for audio mixing is performed through the operation unit 120. In response to the user's operation, the reservation unit 132 selects the music pieces to be mixed, determines the playback point (mixing point) at which the music pieces are mixed, and sets the playback start point based on the determined mixing point.

Herein, the playback start point refers to a audio output start point, at which the decoding process by each of the first and second playback units 133 and 134 is performed to output audio information from the audio output unit 150. In other words, more specifically, the playback start point refers to a start point of the playback with audio output.

It should be noted that the reservation unit 132 is optionally configured to set the playback start point of the music piece independently of the mixing point in accordance with a user's operation. Alternatively, the reservation unit 132 is optionally configured to select and use, as the playback start point, at least one of the mixing point, a playback point that is located before the mixing point by a predetermined time, a point that is located before the mixing point and delimits a music piece (e.g., measures), or a start of a music piece.

The reservation-setting screen illustrated in FIG. 4 includes a display area 301 indicating information on an entirety or a part of the music piece and a display area 302 indicating a part of the display area 301 in an enlarged manner. In an example described below, a reservation for audio mixing is set in a music piece to be played by the DECK 2 while a music piece is being played by the DECK 1 (playback with audio output).

A waveform E31 of an entirety or a part of the music piece currently played by the DECK 1, a waveform E32 of an entirety or a part of the music piece to be played by the DECK 2, an image in a form of a bar E33 indicating a mixing point, and an image in a form of a bar E34 indicating the current playback point of the music piece are shown in the display area 301.

Images displayed in the display area 302 include: a waveform E35 that is an enlarged image of a part near the current playback point of the waveform E31 of the music piece being played by the DECK 1 displayed in the display area 301; a waveform E36 that is an enlarged image of a part the waveform E32 of the music piece to be played by the DECK 2 displayed in the display area 301; an image in a form of a bar E37 indicating the mixing point; and an image in a form of a bar E38 indicating the current playback point.

In the display area 301 in the reservation-setting screen, the display controller 131 fixedly displays the bar E33, which is an image indicating the mixing point of the currently played music piece, at a predetermined position while displaying the waveform E31 in a manner movable in right and left directions on the screen (i.e. directions indicated by an arrow A3) based on the fixed bar E33 in accordance not with the current playback point but with a user's operation. The bar E34 indicating the current playback point is displayed in motion in accordance with the playback status. Consequently, a user can recognize the current playback status even during the process for setting a reservation in view of the movement of the bar E34 indicating the current playback point on the waveform E31 of the music piece currently played by the DECK 1 in accordance with the playback status.

In contrast, the display controller 131 displays the waveform E32 of the music piece to be played by DECK 2 in a manner movable in right and left directions (i.e., directions indicated by an arrow A4) based on the fixed bar E33 in accordance not with the current playback point but with a user's operation.

Similarly, also in the display area 302, the display controller 131 displays the waveforms E35 and E36 in a manner movable in the right and left directions (directions indicated by arrows A5 and A6) based on the fixed bar E37 indicating the mixing point in accordance not with the current playback point but with a user's operation. The bar E38 indicating the current playback point is displayed in motion in accordance with the playback status. Consequently, a user can recognize the current playback status even during the process for setting a reservation in view of the movement of the bar E38 indicating the current playback point on the waveform E35 of the music piece currently played by the DECK 1 in accordance with the playback status.

A user can set the mixing point by, for instance, moving the waveforms E31 and E32 of the music pieces shown in the display area 301 in the right and left directions by the user's operation through the operation unit 120 to roughly align the playback point with the bar E33 indicating the mixing point and then moving the waveforms E35 and E36 (enlarged images) of the music pieces shown in the display area 302 in the right and left directions to accurately and precisely align the playback points of the music pieces with the bar E37 indicating the mixing point. Further, when a CUE POINT is set in the music pieces to be mixed, the mixing point is optionally capable of being set by aligning the CUE POINT with the bars E33 and E37.

It should be noted that, though enlarged images of parts of the display area 301 are displayed in parallel in the display area 302 in the example illustrated in FIG. 4, two or more images of waveforms with different magnifications are optionally displayed in a switching manner as in the usual playback screen. For instance, a screen corresponding only to the display area 301 illustrated in FIG. 4 and a screen corresponding only to the display area 302 illustrated in FIG. 4 are optionally displayed in a switching manner. Alternatively, only one of the above screens is optionally displayed. Further, a zooming ratio in each of the screens is optionally suitably determined and the screens are optionally suitably switched in response to a user's operation through the operation unit 120.

As described above, the waveform of the music piece where the mixing point is to be set is fixedly displayed in the reservation-setting screen, whereas the bar indicating the playback point of the music piece being played (playback with audio output) is displayed in motion in accordance with the current playback point. Accordingly, even while the first music piece is being played, a user can accurately set the mixing point for the second music piece and can recognize the playback status of the music piece even while setting the reservation.

It should be noted that the process for setting a reservation for audio mixing is completed based on a user's operation through the operation unit 120. Further, after completing the process for setting a reservation for audio mixing, the music piece whose playback has been reserved is optionally outputted from the playback start point corresponding to the set mixing point through the audio output unit 150 to enable the music piece to be heard by a headphone or the like.

In the above-described example, the waveform of the music piece whose reservation for playback is to be set is fixedly displayed. However, whether to display as such can be specified by a user, whereby the usability for the user is further improvable.

Reservation-Execution Screen for Audio Mixing

When the reservation set by the reservation unit 132 is executed, the display controller 131 displays a playback-execution screen illustrated in FIG. 5.

The reservation-execution screen illustrated in FIG. 5 includes a display area 401 indicating information on an entirety or a part of the music piece and a display area 402 indicating a part of the display area 401 in an enlarged manner. An example in which a reservation set for the DECK 2 is executed while a music piece is being played by the DECK 1 will be described below. It should be noted that the playback start point determined in the process for setting a reservation is at the start of the music piece to be played by the DECK 2 in the example below.

A waveform E41 of an entirety or a part of the music piece being played by the DECK 1, a waveform E42 of an entirety or a part of the music piece where the reservation has been set in the DECK 2, an image in a form of a bar E43 indicating a current playback point, and an image in a form of a bar E44 indicating the set mixing point are shown in the display area 401.

Images displayed in the display area 402 include: a waveform E45 that is an enlarged image of a part near the current playback point of the waveform E41 of the music piece being played by the DECK 1 displayed in the display area 401; a waveform E46 that is an enlarged image of a part of the waveform E42 of the music piece where the reservation has been set in the DECK 2 displayed in the display area 401; an image in a form of a bar E47 indicating the current playback point; and an image in a form of a bar E48 indicating the set mixing point.

In the display area 401 of the reservation-execution screen, the display controller 131 fixedly displays the bar E43, which is an image indicating the current playback point of the music piece currently played by the DECK 1, at a predetermined position and displays the waveform E41 in a manner moving in a left direction on the screen (i.e. direction indicated by an arrow A7) based on the fixed bar E43 in accordance with the current playback point. At this time, the bar E44 indicating the mixing point is also displayed in a manner moving in the left direction on the screen (the direction indicated by the arrow A7) in accordance with the current playback point as in the waveform E41. Consequently, a user can locate the current playback point of the music piece and, at the same time, the playback start point for starting the audio mixing in view of the movement of the waveform E41 of the currently played music piece in accordance with the playback status.

In contrast, the waveform 42 of the music pieces on which the reservation is set is displayed in a manner moving in the left direction on the screen (the direction indicated by the arrow A8) based on the bar E43 that is the image indicating the current playback point. At this time, in accordance with the playback status of the music piece being played by the DECK 1, the display controller 131 moves the waveform 41 of the music piece being played by the DECK 1, the bar E48 that is the image indicating the mixing point, and the waveform E42 of the music piece where the reservation has been set in the DECK 2, while the mutual positional relationship therebetween is kept.

It should be noted that, in an example illustrated in FIG. 5, the playback start point of the second music piece to be played by the DECK 2 is set at the start of the second music piece in setting the reservation. Accordingly, the display controller 131 displays the waveform E42 of the second music piece at a side timewise later than the bar E43 indicating the current playback point in a manner moving from the right side of the screen toward the bar E43 that is the image indicating the current playback point. Consequently, the waveform E42 of the music piece where the reservation has been set in the DECK 2 is displayed in motion since before the current playback point reaches the determined playback start point. In other words, the waveform E42 of the music piece where the reservation has been set is displayed on the display screen as if the music pieces are started being played from a minus side.

Similarly, also in the display area 402, the display controller 131 displays the waveform E45 and the bar E48 (the image indicating the mixing point) of the music piece being played by the DECK 1 in a manner moving in the left direction on the screen (i.e. direction indicated by an arrow A9) based on the fixed bar E47 in accordance with the current playback point.

Further, the display controller 131 displays the waveform E46 of the music piece where the reservation has been set in the DECK 2 in a manner moving in the left direction on the screen (i.e. direction indicated by an arrow A10) based on the fixed bar E47 while keeping the positional relationship with the waveform 45 of the music piece being played by the DECK 1 and the bar E48 (the image indicating the mixing point).

It should be noted that, though enlarged images of parts of the display area 401 are displayed in parallel in the display area 402 in the example illustrated in FIG. 5, two or more images of waveforms with different magnifications are optionally displayed in a switching manner as on the usual playback screen and the reservation-setting screen. For instance, a screen corresponding only to the display area 401 illustrated in FIG. 5 and a screen corresponding only to the display area 402 illustrated in FIG. 5 are optionally displayed in a switching manner. Alternatively, only one of the above screens is optionally displayed. Further, a zooming ratio in each of the screens is optionally suitably determined and the screens are optionally suitably switched in response to a user's operation through the operation unit 120.

As described hereinabove, on the reservation-execution screen, the waveform of the music piece being played (playback with audio output) is displayed in motion in accordance with the playback status as on the usual playback screen. The waveform(s) of the music piece(s), in which reservation has been set, is displayed in motion in conjunction with the currently played music piece in accordance with the reserved mixing point(s), unlike the usual playback screen and the reservation-setting screen. In other words, the waveform of the music piece where the reservation has been set is displayed in motion in the same manner as in playing a music piece (more specifically, during the playback with audio output) by starting movement of the waveform at a time point before being actually played (i.e. from a time point in the future with the sound still not being outputted).

Accordingly, a user can intuitively recognize that a reservation has been set only by checking whether the waveform(s) of the music piece(s) in which reservation has been made is in motion. A user can also grasp a required time until the reserved mixing point and a required time until the playback start point in accordance with the mixing point by checking a positional relationship between the image in a form of the bar indicating the current playback point and the image in a form of the bar indicating the mixing point. Further, the display area 402, in which information before and after the playback point can be checked in detail, is useful in supporting a user's DJ performance and the like.

It should be noted that, though the playback start point corresponding to the mixing point is set at the start of the second music piece to be played by the DECK 2 in setting the reservation in the above example, the invention is also suitably applicable to a case where an intermediary part of the second music piece (e.g. the playback point corresponding to the CUE POINT, which is in the middle of the second music piece) is set as the mixing point or the playback start point. In this case, while the second playback unit 134 performs the decoding process, the audio output unit 150 does not output the audio information until the playback start point. In other words, the playback without audio output is performed until the playback start point. Meanwhile, in accordance with the playback status of the music piece being played by the DECK 1, the display controller 131 moves the waveform of the music piece being played by the DECK 1, the image in a form of the bar indicating the set mixing point, and the waveform of the music piece where the reservation has been set in the DECK 2, while keeping the mutual positional relationship therebetween, based on the image in a form of a bar indicating the current playback point. In other words, while the image in a form of the bar indicating the current playback point is fixedly displayed, the waveform of the music piece where the reservation has been set in the DECK 2 is displayed on the display device in motion in accordance with the current playback point based on the image indicating the current playback point. Consequently, the waveform of the music piece to be played by the DECK 2 is displayed in a manner moving from the set mixing point or a playback point before (in terms of time) the playback start point, thereby achieving the same advantages as those in the above-described example.

In the above example, the waveform of the music piece is displayed in motion from a state before starting playback (with audio output) by executing reservation. However, whether to display as such can be specified by a user, whereby the usability for the user is further improvable.

Display Mode

It should be noted that the display controller 131 is optionally configured to display at least one of the following elements shown on the display screen in a different display mode (i.e. change the display mode of the waveform) so that the status of setting and executing the reservation can be easily recognized by a user.

For instance, the display mode of the waveform is optionally differentiated between the music piece where the reservation has been set and other music piece that requires manual playback operation. For instance, the display mode of the waveform is optionally differentiated between the music piece where a reservation is to be set and other music piece(s). Alternatively, for instance, when a playback point at an intermediary part of the second music piece is set as the mixing point or the playback start point as described above, the display mode of the waveforms is optionally differentiated between the part where the reservation has been executed and other parts of the music piece. In other words, the display controller 131 is optionally configured to change the display mode of the waveform to be displayed on the display device 110 when the current playback point reaches the mixing point or the playback start point.

The change in the display mode is made on, for instance, at least one of a type of display color, contrast density of the display color, color or monochrome display, type of background color, contrast density of the background color, with or without background color, blinking pattern, or with or without blinking.

The display of the invention, which is exemplified by the display device 110 having a rectangular visible area to be seen by a user in the example illustrated in FIGS. 2 to 5, is not necessarily configured as in the example. For instance, the invention is also applicable to a display device 510 having a circular visible area to be seen by a user as illustrated in FIGS. 6, 7A, and 7B. FIG. 6 illustrates an example of the reservation-setting screen for audio mixing corresponding to the above-described FIG. 4. FIGS. 7A and 7B each illustrate an example of the reservation-execution screen for audio mixing corresponding to the above-described FIG. 5. Examples of the display device 510 having a circular visible area to be seen by a user include a display device provided at the center of a jog dial of a DJ instrument. The display device 510, whose visible area is usually smaller than the display device 110 having a rectangular visible area to be seen by a user, is optionally configured to display limited information. The invention is also applicable to a display device having a visible area, which is not rectangular or circular, to be seen by a user.

The reservation-setting screen illustrated in FIG. 6 is provided with a display area 601 corresponding to the display area 301 described with reference to FIG. 4, an index 602, a display area 603, and a display area 604.

As in the display area 301 illustrated in FIG. 4, the waveform E31 of an entirety or a part of the music piece being played by the DECK 1, the waveform E32 of an entirety or a part of the music piece to be played by the DECK 2, an image in a form of the bar E33 indicating a mixing point, and an image in a form of the bar E34 indicating the current playback point of the music piece are shown in the display area 601.

The index 602 rotates clockwise in synchronization with the rotation speed (for instance, 33 RPM for LP record) of an analog record in accordance with the playback state of the music data based on the beat position information of the music piece being played by the DECK 1. Information on the music piece being played by the DECK 1 is displayed in the display area 603. In the example illustrated in FIG. 6, various information such as deck number, artwork, key change rate indicating a modulation amount of the current key from an original key, BPM, and playback speed is exemplarily displayed. Information related to the playback status is displayed in the display area 604. In the example illustrated in FIG. 6, various information such as playback time, type of operation, and synchronization state of the DECKs 1 and 2 is displayed.

In the display area 601 of the reservation-setting screen, the display controller 131 fixedly displays the bar E33 (the image indicating the mixing point) of the music piece being played at a predetermined position and displays the waveform E31 of the music piece being played in a manner movable in the right and left directions (i.e. the direction indicated by an arrow A3) with reference to the fixed bar E33 in accordance not with the current playback point but with a user's operation, as in the display area 301 illustrated in FIG. 4. The bar E34 indicating the current playback point is displayed in motion in accordance with the playback status. Consequently, a user can recognize the current playback status even during the process for setting a reservation in view of the movement of the bar E34 indicating the current playback point on the waveform E31 of the music piece currently played by the DECK 1 in accordance with the playback status.

Further, the display controller 131 displays the waveform E32 of the music piece to be played by DECK 2 in a manner movable in right and left directions (i.e., directions indicated by an arrow A4) based on the fixed bar E33 in accordance not with the current playback point but with a user's operation.

A user can set the mixing point by moving the waveforms E31 and E32 of the music pieces in the display area 601 in right and left directions by a user's operation on the operation unit 120 to align desired points with the bar E33 indicating the mixing point. Further, when a CUE POINT(s) is set in the music pieces to be mixed, the mixing point is optionally capable of being set by aligning the CUE POINT with the bar E33.

As described hereinabove, the display device 510 having a circular visible area to be seen by a user can display the reservation-setting screen similar to that of the display device 110 having a rectangular visible area to be seen by a user.

It should be noted that, though the display area 601 corresponding to the display area 301 is displayed in the example illustrated in FIG. 6, two or more screens indicating waveforms with different magnifications are optionally displayed in parallel or in a switching manner. For instance, a screen corresponding to the display area 601 illustrated in FIG. 6 and a screen corresponding to the display area 302 illustrated in FIG. 4 are optionally displayed in a switching manner. Alternatively, only one of the above screens is optionally displayed. Further, a zooming ratio in each of the screens is optionally suitably determined and the screens are optionally suitably switched in response to a user's operation through the operation unit 120.

The reservation-execution screen illustrated in FIG. 7A includes a display area 701 corresponding to the display area 401 described with reference to FIG. 5, an index 702, a display area 703, and a display area 704.

As in the display area 401 illustrated in FIG. 5, a waveform E41 of an entirety or a part of the music piece being played by the DECK 1, a waveform E42 of an entirety or a part of the music piece whose playback is reserved in the DECK 2, an image in a form of a bar E43 indicating a current playback point, and an image in a form of a bar E44 indicating the determined mixing point are shown in the display area 701.

The index 702, the display area 703, and the display area 704 are respectively the same as the index 602, the display area 603, and the display area 604 described with reference to FIG. 6.

In the reservation-execution screen, as in the display area 401 illustrated in FIG. 5, the display controller 131 fixedly displays the bar E43, which is an image indicating the current playback point of the music piece being played by the DECK 1, at a predetermined position and displays the waveform E41 in a manner moving in a left direction on the screen (i.e. direction indicated by an arrow A7) based on the fixed bar E43 in accordance with the current playback point in the display area 701. At this time, the bar E44 indicating the mixing point is also displayed in a manner moving in the left direction on the screen (the direction indicated by the arrow A7) in accordance with the current playback point as in the waveform E41. Consequently, a user can locate the current playback point of the music piece and, at the same time, the playback start point for starting the audio mixing in view of the movement of the waveform E41 of the currently played music piece in accordance with the playback status.

In contrast, the waveform 42 of the music pieces on which the reservation is set is displayed in a manner moving in the left direction on the screen (the direction indicated by the arrow A8) based on the bar E43 that is the image indicating the current playback point. At this time, in accordance with the playback status of the music piece being played by the DECK 1, the display controller 131 moves the waveform 41 of the music piece being played by the DECK 1, the bar E48 that is the image indicating the mixing point, and the waveform E42 of the music piece where the reservation has been set in the DECK 2, while the mutual positional relationship therebetween is kept.

It should be noted that, in an example illustrated in FIG. 7A, the playback start point of the second music piece to be played by the DECK 2 is set at the start of the second music piece in setting the reservation as in the example illustrated in FIG. 5. Accordingly, the display controller 131 displays the waveform E42 of the second music piece at a side timewise later than the bar E43 indicating the current playback point in a manner moving from the right side of the screen toward the bar E43 that is the image indicating the current playback point. In other words, the waveform E42 of the music piece where the reservation has been set is displayed on the display screen as if the music pieces are started being played from a minus side.

As described hereinabove, the display device 510 having a circular visible area to be seen by a user can display the reservation-execution screen similar to that of the display device 110 having a rectangular visible area to be seen by a user.

Though the display area 701 corresponding to the display area 401 is exemplarily shown in the example illustrated in FIG. 7A, two or more screens indicating waveforms with different magnifications are optionally displayed in parallel or in a switching manner. For instance, a screen corresponding to the display area 701 illustrated in FIG. 7A and a screen corresponding only to the display area 402 illustrated in FIG. 5 are optionally displayed in a switching manner. Alternatively, only one of the above screens is optionally displayed. Further, a zooming ratio in each of the screens is optionally suitably determined and the screens are optionally suitably switched in response to a user's operation through the operation unit 120.

As described hereinabove, the display device 510 having a circular visible area to be seen by a user is usually smaller in terms of displayable area thereof than the display device 110 having a rectangular visible area, which possibly impairs visibility for a user. Accordingly, the display device is optionally configured to display additional information.

For instance, when the waveform E42 of the music piece where the reservation has been set is to be displayed as if started being played from a minus side in the example described with reference to FIG. 7A, a display area 701A for displaying a required time until the playback start point in a text format may be additionally provided as illustrated in FIG. 7B. According to the above arrangement, the visibility for a user can be ensured even when the display area is relatively small. It should be noted that the display area for indicating the required time until the playback start point in a text format may be also provided to the display device 110 having a rectangular visible area to be seen by a user as described with reference to FIG. 5.

FIG. 8 is a flowchart illustrating how the components operate in displaying the screens related to mixing of music pieces.

In the example illustrated in FIG. 8, the display controller 131 initially displays the usual playback screen on the display device 110 (Step S101). Then, it is determined whether a user's operation for setting a reservation is performed through the operation unit 120 during a usual playback (Step S102). When it is determined that the user's operation for setting a reservation is not performed after a predetermined time elapses (Step S102: NO), the process proceeds to later-described Step S105.

In contrast, when it is determined that the user's operation for setting a reservation is performed (Step S102: YES), the display controller 131 displays the reservation-setting screen on the display device 110 (Step S103). In other words, the display controller 131 changes the display contents on the display device 110 from the playback screen to the reservation-setting screen.

Next, it is determined whether a user's operation indicating completion of the process for setting a reservation via the operation unit 120 is performed (Step S104). When it is determined that the user's operation indicating completion of the process for setting a reservation is performed (Step S104 YES), it is determined whether execution of the reservation has started (Step S105).

When it is determined that the execution of the reservation has not started after a predetermined time elapses (Step S105: NO), the process returns to Step S101.

In contrast, when it is determined that the execution of the reservation has started (Step S105: YES), the display controller 131 displays the reservation-execution screen on the display device 110 (Step S106). In other words, the display controller 131 changes the display contents on the display device 110 from the playback screen or the reservation-setting screen to the reservation-execution screen.

Then, it is determined whether the execution of the reservation has been completed (Step S107). When it is determined that the execution of the reservation has been completed (Step S107: YES), the process returns to Step S101, where the display controller 131 again displays the usual playback screen on the display device 110. In other words, the display controller 131 restores the display contents displayed on the display device 110 back to the playback screen.

When it is determined that the execution of the reservation does not start after a predetermined time elapses (Step S105: NO), the process returns to Step S101, where the display controller 131 again displays the usual playback screen on the display device 110. In other words, the display contents on the display device 110 are kept on the playback screen by the display controller 131.

It should be noted that, when the process returns to Step S101 after setting the reservation and before executing the reservation and the display controller 131 again displays the usual playback screen on the display device 110, the display contents on the display device 110 transition from the reservation-setting screen to the usual playback screen. As a result, the waveform of the currently played music piece is displayed in motion whereas the waveforms of the rest of the music pieces are fixedly displayed, whereby a user can intuitively recognize the progress of the currently played music piece.

When the process returns to Step S101 after completing the execution of the reservation and the display controller 131 again displays the usual playback screen on the display device 110, the display contents on the display device 110 transition from the reservation-execution screen to the usual playback screen. As a result, the waveform of the currently played music piece is displayed in motion whereas the waveforms of the rest of the music pieces are fixedly displayed, whereby a user can intuitively recognize the progress of the currently played music piece. At this time, the display mode of the waveform is optionally differentiated between a part at which a reservation has been executed and other parts of the waveform.

Further, with regard to the mixing process using DECKs 1 and 2, though a process for setting and executing the reservation for sequentially mixing the music piece to be played by the DECK 2 with the music piece being played by the DECK 1 is described in the above example, the same applies to a process for mixing the music piece to be played by the DECK 1 with the music piece being played by the DECK 2.

According to the above-described exemplary embodiments of the invention, with regard to mixing of the first and second music pieces, the reservation unit 132 for setting the playback start point (mixing point) of the second music piece and the display controller 131 for displaying, on the display device 110, the first screen including an image indicating time information of the current playback point and the playback start point of a music piece assigned with the playback start point and moving the image indicating the time information of the playback start point based on the image indicating the current playback point are provided. Accordingly, an acoustic device, a program stored on a non-transitory computer-readable storage medium, and a control method which enable a user to conveniently perform audio mixing can be provided.

Typically, the status of the determined reservation and the status of execution of the reservation are not easily recognized until the execution of the reservation is actually started, which sometimes causes anxiety to a user. However, according to the exemplary embodiment of the invention, whether the reservation has been set, details of the determined reservation, and the status of reservation execution can be easily presented to a user.

Further, according to the exemplary embodiment of the invention, the image indicating the time information of the playback start point includes the music waveform of the second music piece. Accordingly, the status of setting and executing a reservation can be visually and easily presented to a user by moving or not moving the waveform and/or changing the mode of the motion in displaying the music waveform.

Further, according to an exemplary embodiment of the invention, the reservation unit 132 is configured to set the playback start point of the second music piece while the first music piece is being played. Accordingly, even in response to current users' requests such as mixing music pieces of various genres and with significantly different BPMs, impromptu mixing is possible without the need for preparation in advance. Furthermore, even while a music piece is being played, it is possible to achieve highly immediate mixing without interfering with the playback of the music piece.

According to the exemplary embodiment of the invention, the first screen related to the process for executing the reservation and the second screen related to the process for setting the reservation by the reservation unit 132 are displayed on the display device 110 in a switching manner. A reservation can thus be set without interrupting the playback of a music piece even while the music piece is being played, which is useful in supporting a DJ performance and the like of a user.

Further, according to an exemplary embodiment of the invention, the display controller 131 displays the music waveform of the second music piece on the display device 110 in a manner moving in accordance with the current playback point on the first screen related to the process for executing the reservation whereas the music waveforms of the first and second music pieces are displayed on the display device 110 in a manner movable in accordance with a user's operation on the second screen related to the process for setting the reservation. Accordingly, the status of setting and executing a reservation can be presented to a user by changing the mode for displaying the music waveform and the user's operation can be optimized.

Further, according to an exemplary embodiment of the invention, the display controller 131 displays the image indicating the time information on the display device 110 with the display mode thereof being changed on the first screen related to the process for executing the reservation when the time runs beyond the playback start point while the second music piece where the playback start point is set is being played. Accordingly, completion of the process for executing the reservation can be easily presented to a user.

It should be noted that the "playback" in the invention, which is described as a series of processes of generating the audio signals by the decoding process of the first and second playback units 133 and 134 and outputting the audio signals by the audio output unit 150 as the audio information in the above-described exemplary embodiment, is not necessarily defined as in the exemplary embodiment(s). For instance, the invention is also applicable when the "playback" is defined as a process until the audio signals are generated through the decoding process by the first and second playback units 133 and 134.

The image indicating the time information of a music piece, which is exemplified by the music waveform in the above-described exemplary embodiment, is not necessarily in a form of the music waveform in the invention. For instance, a bar indicating the playback point, an image indicating a numeral(s), and/or a combination of the bar and the numeral is usable as the image indicating the time information of the music piece.

It should be noted that the display screens described in the first exemplary embodiment are merely exemplary and are not limited to those described in the present exemplary embodiment in terms of the elements, design, arrangement, and the like. Further, the elements, design, arrangement, and the like of the display screen may be determined by a user.

Further, the invention, which is applied to the acoustic device 100 having one display device 110 in the above-described exemplary embodiment, is optionally applied to an acoustic device 100 having two or more display devices. For instance, the invention is applicable to an acoustic device and the like, in which DECKs 1 and 2 each have a sub-display device in a form of the display device 510 described with reference to FIGS. 6, 7A, and 7B.

The invention is applicable not only to an acoustic device such as a DJ instrument and DJ application but also to a streaming service using a music application software and/or the Internet and the like. In this case, the invention is applicable to, for instance, an automatic playback using a playlist or the like.

The acoustic device, which is a 2-channel acoustic device including two DECKs 1 and 2 in the above exemplary embodiments, is optionally a 4-channel acoustic device for achieving the same functionality. In addition, the invention is applicable not only to a DJ instrument but also to a typical mixer, electronic music instrument, and acoustic device such as DAW (Digital Audio Workstation) and DTM (Desk Top Music).

Suitable exemplary embodiments of the invention have been detailed above with reference to the attached drawings. However, the scope of the invention is not limited to the exemplary embodiments. It would be obvious for those skilled in the art to which the invention pertains that various modifications and revisions are conceivable within the technical idea described within claims, and it is understood that such modifications and revisions are naturally within the technical scope of the invention.

The invention claimed is:

1. An acoustic device configured to mix a first music piece and a second music piece, the acoustic device comprising a processor configured to:

set a mixing point on each of the first music piece and the second music piece and set a playback start point of the second music piece corresponding to the mixing point; and display a reservation-execution screen on which a first image indicating a music waveform of the second music piece and time information indicating the playback start point provided on the music waveform is moved based on a second image indicating a current playback point on a display device when a reservation set by the processor is executed.

2. The acoustic device according to claim 1, wherein the processor is further configured to set the playback start point of the second music piece while the first music piece is being played.

3. The acoustic device according to claim 1, wherein the processor is further configured to switchably display, on the display device, the reservation-execution screen and a reservation-setting screen on which the processor sets the playback start point of the second music piece.

4. The acoustic device according to claim 3, wherein the processor is further configured to:

on the reservation-execution screen, display the first image in motion on the display device since before the current playback point of the second music piece reaches the playback start point; and on the reservation-setting screen, display an image indicating the music waveform of the first music piece in motion and the first image indicating the music waveform of the second music piece in motion on the display device in response to a user's operation.

5. The acoustic device according to claim 1, wherein the processor is further configured to, on the display device, fixedly display the second image and display the first image in a manner moving based on the second image in accordance with the current playback point on the reservation-execution screen.

6. The acoustic device according to claim 1, wherein the processor is further configured to display the first image with a display mode of a part of the first image indicating the music waveform of the second music piece being changed on the reservation-execution screen on the display device when the reservation set by the processor is executed and the current playback point reaches the playback start point.

7. A non-transitory computer-readable storage medium storing a program configured to cause a computer to function as the acoustic device according to claim 1.

8. A control method executed using an acoustic device configured to mix a first music piece and a second music piece, the control method comprising:

setting a mixing point on each of the first music piece and the second music piece;

setting a playback start point of the second music piece corresponding to the mixing point; and displaying a reservation-execution screen on which a first image indicating a music waveform of the second music piece and time information indicating the playback start point provided on the music waveform is moved based on a second image indicating a current playback point on a display device when a set reservation is executed.

* * * * *